Figure 1:
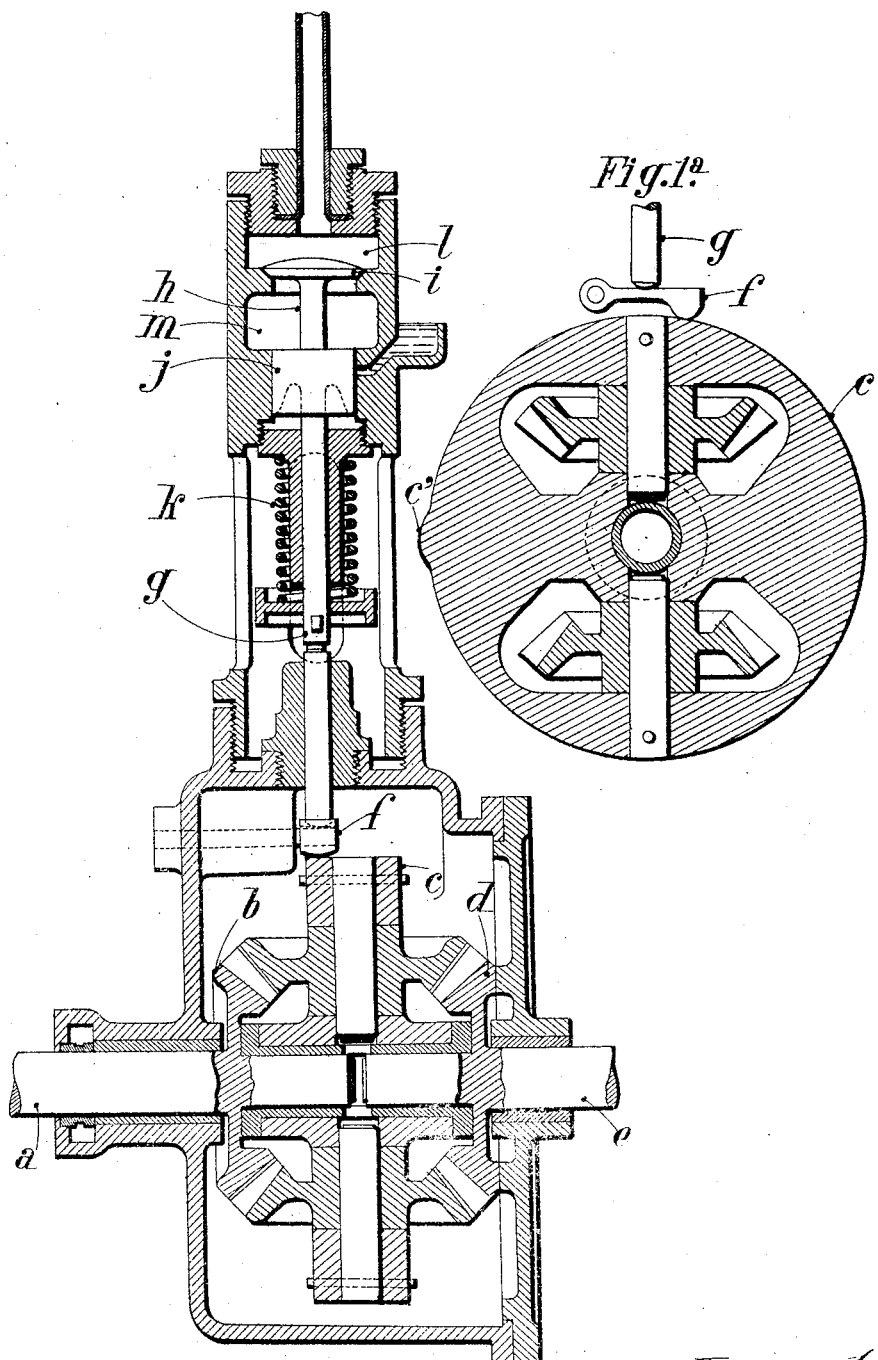

No. 754,287. PATENTED MAR. 8, 1904.
A. DE DION & G. BOUTON.
PRESSURE INDICATOR.
APPLICATION FILED MAR. 18, 1903.
NO MODEL. 3 SHEETS—SHEET 2.
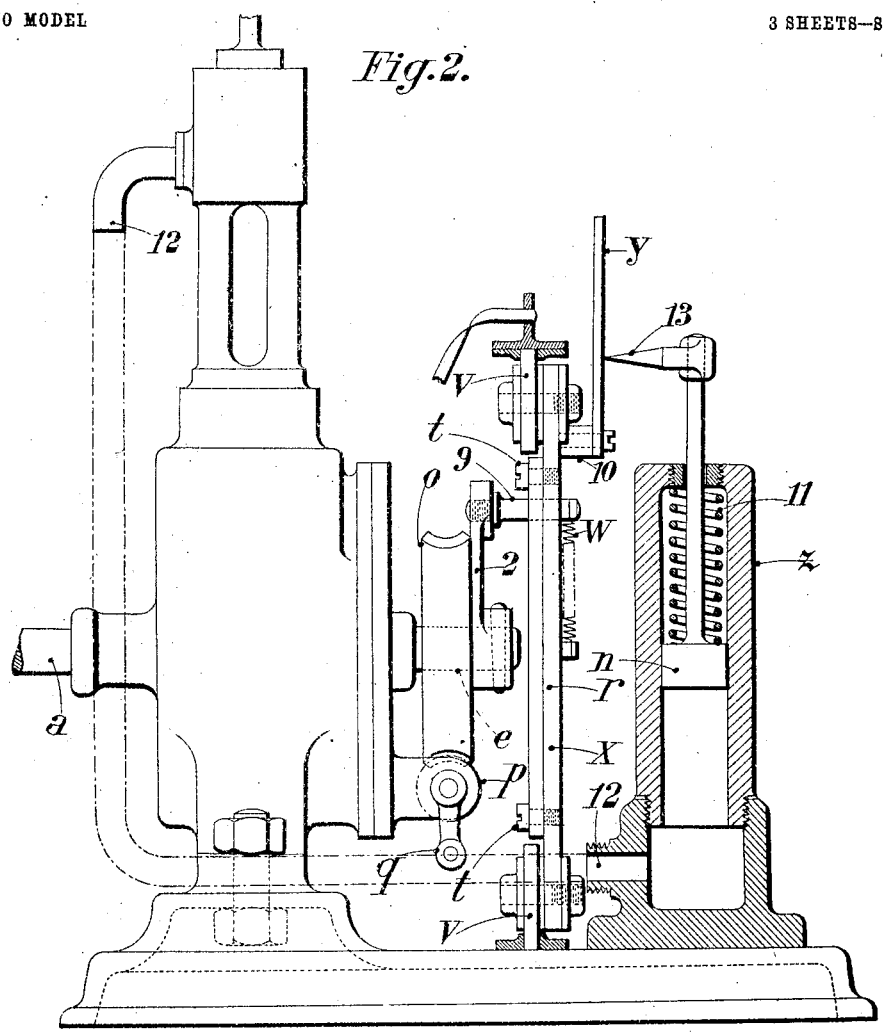
Fig. 2.
Fig. 3.
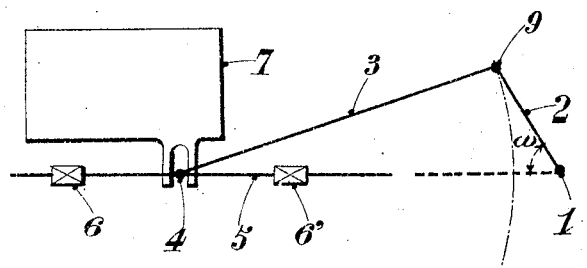
Witnesses:
William T. Jones
James L. Norris
Inventors
Albert de Dion
Georges Bouton
By James L. Norris
Atty.

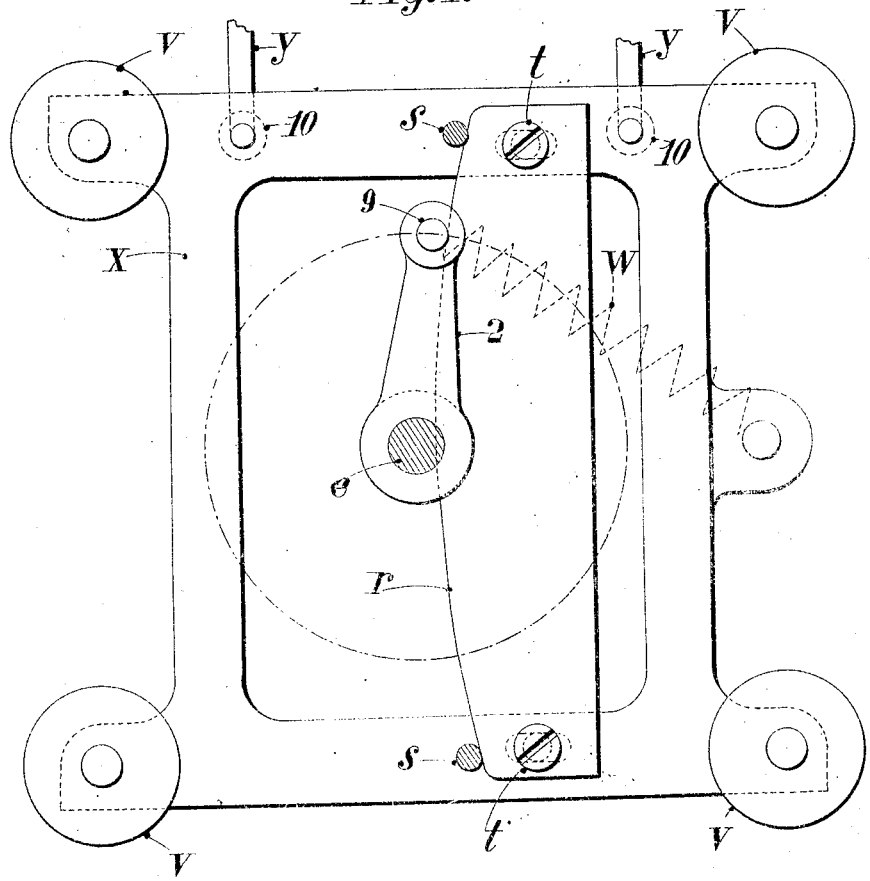

No. 754,287. Patented March 8, 1904.

UNITED STATES PATENT OFFICE.

ALBERT DE DION AND GEORGES BOUTON, OF PUTEAUX, FRANCE.

PRESSURE-INDICATOR.

SPECIFICATION forming part of Letters Patent No. 754,287, dated March 8, 1904.

Application filed March 18, 1903. Serial No. 148,443. (No model.)

*To all whom it may concern:*

Be it known that we, ALBERT DE DION and GEORGES BOUTON, engineers, citizens of the French Republic, residing at Puteaux, Department of Seine, France, (whose post-office address is 36 Quai National, in the said city,) have invented certain new and useful Improvements in Pressure-Indicators, of which the following is a specification.

Our invention relates to an apparatus for measuring and recording the pressure in the cylinders of motors to which the fluid is supplied periodically—such as steam-engines and gas or oil motors, (however high their speed may be,) pumps with variable delivery, and the like—the measuring and recording of the pressure being obtained independently of the duration of the working cycle, and it may extend over the whole duration of the cycle or may take place only at one special point of the stroke in each successive cycle.

The indicators at present in use are not capable of giving very precise indications when the speed of the motors to which they are applied exceed, say, two hundred or three hundred revolutions per minute, the inertia of the indicating parts and that of the springs preventing them from responding to the very rapid movement imparted to them, while at the same time the springs cannot be made sensitive enough to record accurately all the variations of pressure.

This invention has for its object to reduce to a minimum the velocity of the moving parts of the indicator. The indicator has a piston working in a cylinder, which piston is subjected during each successive cycle to the pressure corresponding to a definite point of the stroke of the piston of the engine or motor. By varying this point in a continuous manner from the beginning to the end of the stroke of the piston of the motor a series of successive values is obtained in each successive cycle, whereby the whole of these points will produce the required diagram.

In the following description we will presume that our improved apparatus is applied to a motor working on the four-stroke cycle system.

In order that our invention may be clearly understood, we shall describe it with reference to the accompanying drawings, of which—

Figure 1 shows a longitudinal section of the mechanism for opening the cylinder of the indicator. Fig. 1ª is a detail. Fig. 2 shows an elevation, partly in section, of the device. Fig. 3 is a diagrammatic view of the devices acting the frame supporting the paper. Fig. 4 is an end view of a part of the Fig. 1.

A shaft $a$, Figs. 1 and 2, rotating at the same speed as the motor, carries a bevel-wheel $b$, gearing with two corresponding wheels of an arrangement of differential gear, the said two wheels being carried on a disk $c$, loosely mounted on the said shaft $a$. With these two bevel-wheels gears a second bevel-wheel $d$, keyed on a shaft $e$ coaxial with the first-named shaft $a$. The disk $c$, carrying the bevel-wheels, is provided on its periphery with a cam-surface $c'$, which at each revolution of the disk raises, through the medium of a lever $f$, Fig. 1ª, the stem $g$ of an equilibrium or double-seat valve $h$. The areas $i$ and $j$ of the acting surfaces of this valve are equal, so that the pressures on both surfaces balance each other. A spring $k$ of moderate power only therefore need be provided for keeping the valve closed, the resistance opposing the left of the said valve being easily overcome at those points of the cycle where the pressure in the cylinder is low—for instance, at the end of the exhaust stroke principally, if then high pressures are recorded. One part $j$ of the equilibrium-valve is preferably in the form of a piston, which may be provided with a packing-ring to render it fluid-tight in the seat in which it slides. The fluid-tight piston may be assured by a constant greasing. A space $l$ on one side of the equilibrium-valve communicates with the motor or engine cylinder, which space when the valve is moved from its seat communicates with a space $m$ between the two parts of the valve, which latter space communicates with the lower face $n$ of the indicator-piston, Fig. 2, the motive fluid acting on the piston against the counteracting pressure of a spring 11 bearing on its upper face. The stem of the indicating-piston carries the diagram-tracing point 13. The capacity $l$ of the space on the side of the equilibrium-valve which communicates with the cylinder of the motor should be as small as possible, so as not to unduly increase the clearance-space of the motor-cylinder; but the space $m$ between the two portions of the equilibrium-valve, the tube or passage connecting the said space with the cylinder in which the piston of the indicator slides, and the part of the cylinder beneath the piston may be of any size.

If the shaft $e$ be supposed to be stationary, the disk $c$ will for each revolution of the shaft $a$ effect half a revolution. Therefore for each two revolutions of the said shaft $a$—i. e., once for each cycle—the equilibrium-valve will be raised and the pressure in the motor-cylinder will be transmitted to the lower face of the indicator-piston. If the shaft $e$ has imparted to it a continuous rotatory motion by hand—for instance, by means of a handle $q$, a worm $p$, and worm-wheel $o$—the moment at which the equilibrium-valve is lifted will continually vary at each successive stroke of the engine or motor piston, and it will thus establish communication between the indicator and the motor or engine cylinder at successive different points in each cycle, and thereby produce by these successive points a diagram of the entire cycle. In order to obtain a diagram easy to read, it is necessary to impart to the frame supporting the indicator-card a reciprocating motion which is proportional to the motion of the motor-piston during the rotation of the shaft $e$ that drives the indicating apparatus. This may be accomplished as follows with reference to Fig. 3 of the drawings:

1 is the center of the shaft $e$; 2, a crank fitted on it; 3, a connecting-rod jointed at 4 to a stem 5, which slides through the bearings 6 6' and is fitted at 4 to the frame 7, carrying the paper or card on which the diagram is recorded. For an angular displacement of the crank 2 a translation movement is imparted to the frame 7, which we suppose directed by suitable means, this movement depending on the length of the crank 2 and of the connecting-rod 3. If the throw of the crank 3 in relation to the length of the connecting-rod 2 is the same as the ratio between the throw of the crank and the length of the connecting-rod of the engine, the frame 7, carrying the indicator-card, will be caused to move to an extent proportional to the movement of the motor or engine piston.

To enable the diagram-card-reciprocating device to be used with other engines or motors, it will only be necessary to alter the length of the connecting-rod 3 of the card-reciprocating apparatus to suit the ratio of the throw of the crank to the length of the connecting-rod of the said engine to which it is to be applied. This arrangement of crank and connecting-rod reproduces on a small scale the movement of the piston and crank of the motor which is being indicated. The connecting-rod 3 may, however, be dispensed with, and the movement may be imparted to the diagram-card carrier by causing the crank-pin 9, driving the said carrier, to bear constantly on a segmental piece $r$, curved to a radius equal to the length of the aforesaid connecting-rod minus the radius of the crank-pin 9, the said segmental piece $r$ receiving reciprocating motion by the crank-pin 9. In this case the shaft $e$ carries a crank 2, the pin 9 of which is kept in contact with the edge of the segmental piece $r$ by a spring $w$. The throw of the crank 9 bears to the radius of the segment plus the radius of the crank-pin the same ratio as that of the driving-crank to the connecting-rod of the motor. The segment $r$ is kept in contact by screws $t$ with two stops $s$ on a frame $x$, provided with rollers $v$, moving in suitable guides connected to the bed-plate of the indicating apparatus. This frame is attached, by means of stays 10, to the frame $y$, carrying the indicator-card. On the frame of the apparatus is fitted the indicator $z$, the piston of which is sustained by a spring 11, which is fixed by its lower end to the piston and by its upper end to the upper part of the cylinder, the piston being thus able to be moved by an increasing or a decreasing pressure, which is sent through the tube 12, uniting the space $m$ to the cylinder of the indicator.

The stem of the piston carries a recording-point, which records the diagram on the frame 14 directly or through an amplifying device.

To permit of this apparatus being used in connection with motors or apparatus of different constructions, it will be only necessary to fit it with a curved segment the radii of which added to the radius of the crank-pin will bear to the throw of this crank the same ratio as the crank of the motor to be indicated bears to the connecting-rod of the same. If instead of a diagram corresponding to a full piston-stroke it be desired to ascertain the variations of pressure at determinated points of the stroke of the piston for several successive cycles—for example, when the conditions of working of the motor (such as time of ignition, carburization, and the like) are altered—the moment of lifting of the equilibrium-valve $h$ is altered by turning the crank 9 on the worm-wheel shaft to a corresponding position. The coaxial shaft 2 being left in this position, the indicator-card-carrying frame will have imparted to it a reciprocating movement, or this frame may be replaced by a cylinder rotating at a uniform speed, so that the curve traced thereon will show the required variation.

The hereinbefore-described apparatus may be used as an indicator for two-stroke motors; but the equilibrium-valve opens then only once in every two cycles. If it be wished that the equilibrium-valve shall open once in every revolution, the apparatus must be modified by arranging the same on the coaxial shaft $e$ and by controlling the angular motion of the disk $c$, carrying the bevel-wheels.

Having thus described and ascertained the nature of our invention and in what manner the same may be performed, we declare what we claim is—

1. In a pressure-indicator for recording the variable pressure in a motor-cylinder, an indicator mechanism provided with a cylinder, means for establishing communication between the two cylinders, means for opening and closing said communication, means for actuating said opening and closing means, means operated by the pressure in the motor-cylinder for operating said actuating means for the opening and closing means, and means for manually operating said actuating means for the opening and closing means.

2. In a pressure-indicator for recording the variable pressure in a motor-cylinder, an indicator mechanism provided with a cylinder, means for establishing communication between the two cylinders, a double valve for opening and closing said communication, and means for imparting a reciprocating movement to said double valve.

3. A pressure-indicator for recording the variable pressure in a motor-cylinder, an indicator mechanism provided with a cylinder, means for establishing communication between the said cylinders, means for opening and closing said communication, a disk provided with a cam-surface adapted to engage and operate said opening and closing means, a differential gearing for operating said disk, a driven shaft for operating said gearing, and a manually-operated shaft also adapted to operate said gearing.

4. A pressure-indicator for recording the variable pressure in a motor-cylinder, an indicator mechanism provided with a cylinder, means for establishing communication between the said cylinders, a double valve for opening and closing said communication, a disk provided with a cam-surface adapted to engage and operate said valve, a differential gearing for operating said disk, a driven shaft for operating said gearing, and a manually-operated shaft also adapted to operate said gearing.

5. In a pressure-indicator for recording the variable pressure in a motor-cylinder, an indicator-mechanism cylinder, means for establishing communication between said cylinder and the motor-cylinder, a double valve adapted to open and close said communication, a piston operating in said indicator-mechanism cylinder, means for preventing the falling down of said piston, a stem connected to said piston, a recording-point carried by said stem, a movable frame carrying a recording-card, means for operating said frame, and means for operating said valve.

6. In a pressure-indicator for recording the variable pressure in a motor-cylinder, an indicator-mechanism cylinder communicating with the motor-cylinder, a double valve for opening and closing communication between the two cylinders, a piston operating in said indicator-mechanism cylinder, a spring adapted to prevent the falling down of said piston, a stem carrying the piston, a recording-point on said stem, a manually-operated shaft, a crank on said shaft, a pin carried by said crank, and a movable segment member carried by the frame and adapted to be engaged by said pin.

In testimony whereof we have hereunto set our hands in presence of two subscribing witnesses.

ALBERT DE DION.
GEORGES BOUTON.

Witnesses:
AUGUSTUS E. INGRAM,
EMILE KLOTZ.